(12) United States Patent
Voss et al.

(10) Patent No.: US 9,555,374 B2
(45) Date of Patent: Jan. 31, 2017

(54) METHOD FOR CONDITIONING CATALYSTS BY MEANS OF MEMBRANE FILTRATION

(75) Inventors: Hartwig Voss, Frankenthal (DE); Ekkehard Schwab, Neustadt (DE); Bram Willem Hoffer, Bergen op Zoom (NL); Till Gerlach, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/266,676

(22) PCT Filed: Apr. 26, 2010

(86) PCT No.: PCT/EP2010/055525
§ 371 (c)(1),
(2), (4) Date: Oct. 27, 2011

(87) PCT Pub. No.: WO2010/125025
PCT Pub. Date: Nov. 4, 2010

(65) Prior Publication Data
US 2012/0071316 A1 Mar. 22, 2012

(30) Foreign Application Priority Data
Apr. 29, 2009 (EP) .................... 09159041

(51) Int. Cl.
*B01D 61/14* (2006.01)
*B01D 61/20* (2006.01)
(Continued)

(52) U.S. Cl.
CPC .......... *B01D 61/147* (2013.01); *B01D 61/027* (2013.01); *B01D 61/142* (2013.01); *B01D 61/145* (2013.01);
(Continued)

(58) Field of Classification Search
CPC ............. B01J 38/48; B01J 8/005; B01J 8/006; B01J 8/009; B01J 38/00; B01J 38/68; B01J 37/009; B01J 2311/02; B01J 2311/04; B01J 2311/08; B01J 2311/25; B01J 2311/2696; B01J 21/18; B01J 21/20; B01J 23/38; B01J 23/44; B01J 23/90; B01J 25/02; B01J 25/04; B01J 27/28; B01J 27/285; B01J 27/30; B01J 27/32; B01J 29/90; B01J 31/40; B01J 31/4069; B01D 11/00; B01D 11/002; B01D 11/02; B01D 11/0415; B01D 12/00; B01D 31/00; B01D 31/02; B01D 31/022; B01D 31/025; B01D 31/12; B01D 31/14; B01D 31/142; B01D 31/145; B01D 31/22; B01D 31/58; B01D 61/027; B01D 61/14; B01D 61/145; B01D 61/147; B01D 61/16; B01D 61/20; B01D 2315/16; B01D 61/142; B01D 61/58
(Continued)

(56) References Cited

U.S. PATENT DOCUMENTS 4,414,401 A   11/1983 Wintermeyer et al.
4,571,444 A * 2/1986 Black et al. .................. 585/819
(Continued)

FOREIGN PATENT DOCUMENTS

CA   2080478 A1   10/1991
CN   1377875 A    11/2002
(Continued)

OTHER PUBLICATIONS

Schwartz et al., Pall Life Sciences, Scientific & Technical Report, Diafiltration: A Fast, Efficient Method for Desalting, or Buffer Exchange of Biological Systems, 2013.*
(Continued)

*Primary Examiner* — Joseph Drodge
(74) *Attorney, Agent, or Firm* — Oblon, McClelland, Maier & Neustadt, L.L.P.

(57) ABSTRACT

The present invention relates to a method of conditioning suspended catalysts, wherein at least part of the catalyst-
(Continued)

comprising reaction medium is taken from one or more reactors and the suspended, at least partially inactivated catalysts are separated off and purified by means of at least one membrane filtration, with at least one of the membrane filtrations being carried out as a diafiltration.

14 Claims, 1 Drawing Sheet

(51) Int. Cl.
B01D 61/58 (2006.01)
B01D 61/02 (2006.01)
B01J 21/18 (2006.01)
B01J 23/38 (2006.01)
B01J 23/44 (2006.01)
B01J 25/02 (2006.01)
B01J 38/00 (2006.01)
B01J 38/48 (2006.01)

(52) U.S. Cl.
CPC ............... B01D 61/58 (2013.01); B01J 21/18 (2013.01); B01J 23/38 (2013.01); B01J 23/44 (2013.01); B01J 25/02 (2013.01); *B01D 2315/16* (2013.01); *B01J 38/00* (2013.01); *B01J 38/48* (2013.01)

(58) Field of Classification Search
USPC ........ 502/20, 22, 24, 514; 210/23, 638, 639, 210/650, 651, 805; 585/818, 819; 422/617, 618, 619, 620
See application file for complete search history.

(56) References Cited

U.S. PATENT DOCUMENTS

| | | | | |
|---|---|---|---|---|
| 5,215,667 | A | * | 6/1993 | Livingston et al. ........... 210/651 |
| 5,766,478 | A | * | 6/1998 | Smith .................... B01D 61/16 210/638 |
| 2003/0018210 | A1 | * | 1/2003 | Gelling ................ B01D 61/027 560/207 |
| 2005/0147757 | A1 | * | 7/2005 | Roh et al. ................... 427/372.2 |
| 2007/0034576 | A1 | * | 2/2007 | Stuer ..................... C07F 15/008 210/767 |
| 2008/0044324 | A1 | * | 2/2008 | Ying ..................... B01J 8/0214 422/211 |
| 2009/0163347 | A1 | * | 6/2009 | Shah ........................ B01J 38/72 502/21 |
| 2009/0163349 | A1 | * | 6/2009 | Elomari ................... B01J 27/32 502/26 |
| 2009/0163350 | A1 | * | 6/2009 | Da Costa ............. B01D 61/147 502/31 |
| 2010/0163499 | A1 | * | 7/2010 | Odueyungbo ......... C10G 47/00 210/787 |
| 2010/0167910 | A1 | * | 7/2010 | Odueyungbo ....... B01D 61/142 502/24 |

FOREIGN PATENT DOCUMENTS

| | | |
|---|---|---|
| CN | 1394672 A | 2/2003 |
| DE | 100 57 891 A1 | 5/2002 |
| EP | 0 052 719 A1 | 6/1982 |
| EP | 1 103 303 A1 | 5/2001 |
| JP | 5-023680 A | 2/1993 |
| WO | WO-91/16294 A1 | 10/1991 |
| WO | WO-99/01206 A1 | 1/1999 |
| WO | WO-2004/112957 A1 | 12/2004 |
| WO | WO-2009/086107 A2 | 7/2009 |

OTHER PUBLICATIONS

Bartholomew; Applied Catalysis A: General 212 (2001) 17-60.*
1996, Pluronic Product Disclosure, PDF.*
U.S. Appl. No. 13/250,232, filed Sep. 30, 2011, Voss, et al.
Office Action issued Nov. 27, 2014 in Chinese Patent Application No. 201080018979.5 (Submitting English translation only).
Hanshan Qian, et al., "Recycling technology and application of solid waste in chemical industrial", Petrochemical Press, Feb. 28, 2007, p. 294 (reference not available submitting statement of relevancy).

* cited by examiner

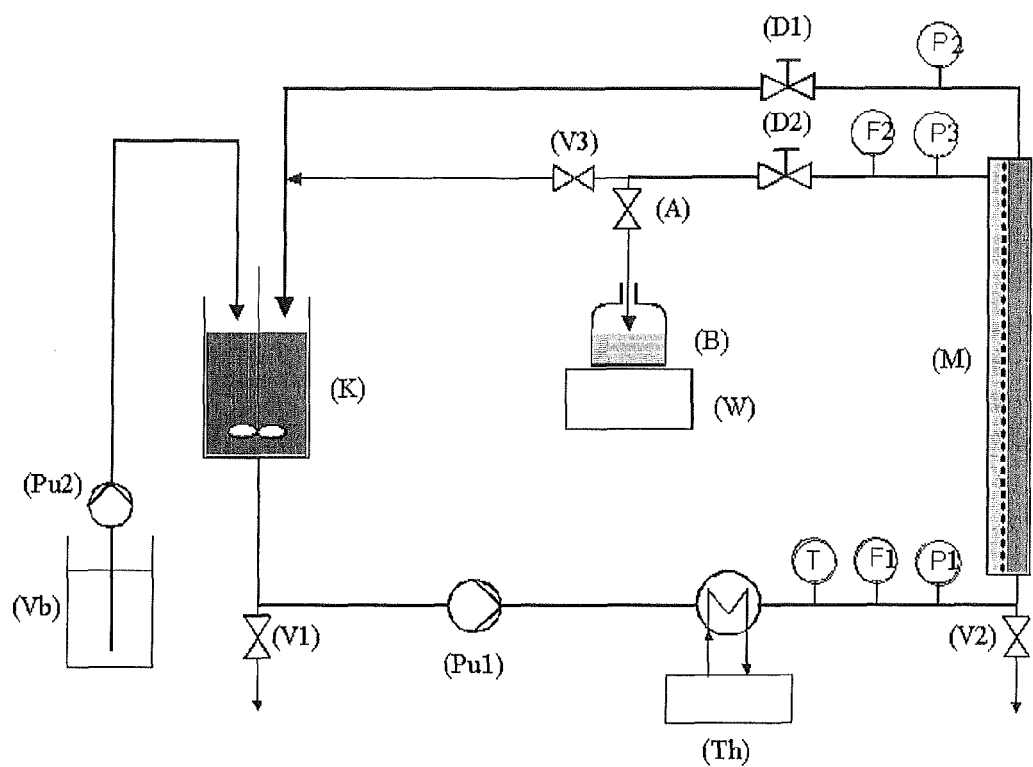

METHOD FOR CONDITIONING CATALYSTS BY MEANS OF MEMBRANE FILTRATION

CROSS-REFERENCE TO RELATED APPLICATIONS

This application is a national stage application (under 35 U.S.C. §371) of PCT/EP2010/055525, filed Apr. 26, 2010, which claims benefit of European application 09159041.4, filed Apr. 29, 2009, the contents of each of which are incorporated herein by reference in their entireties.

FIELD OF THE INVENTION

The present invention relates to a method of conditioning suspended catalysts, in which at least part of the catalyst-comprising reaction medium is taken from one or more reactors and the suspended, at least partially inactivated catalysts are separated off and purified by means of at least one membrane filtration, with at least one of the membrane filtrations being carried out as a diafiltration.

For the purposes of the present invention, the term conditioning refers to preparation for reuse as material or disposal, in particular purification or purification and concentration.

Use of the present invention enables the catalyst to be separated off in a very simple way from the reaction medium which may comprise toxic organic solvents and/or reaction products and also starting materials. A concentration step can also be integrated into the method of the invention. Accordingly, the inactivated catalyst after carrying out the method of the invention is preferably present in water, in concentrated form and essentially free of organic compounds, so that reuse as material or disposal can be carried out without further conditioning.

The method of the invention is versatile and can be used for a wide variety of catalyst types and catalysts having different particle sizes which can be used in a variety of catalyst-aided reactions. The abovementioned features and the features still to be described below of the method of the invention can therefore be employed not only in the specific combination indicated in each case but also in other combinations without going outside the scope of the invention.

Since the invention describes a method of conditioning suspended catalysts, the term catalysts will in the following relate to suspended catalysts.

BACKGROUND

It is known that the activity of catalysts gradually decreases during use, for example as a result of ageing and poisoning. To be able to maintain a constant performance level of the reaction, fresh catalyst is generally added. However, tight limits are imposed on this procedure by the progressive increase in the catalyst or solids content of the reaction suspension. For this reason, an expensive interruption of the reaction has to be carried out at regular intervals in order to discharge part or all of the generally completely or partially inactivated catalysts and replace them by fresh catalysts of the same type or a different type. The inactivated catalysts can subsequently be disposed of or used for reusing individual catalyst constituents, in particular their noble metal content, as material.

A person skilled in the art will know of various techniques by means of which a catalyst can be separated off from the reaction medium and, if appropriate, concentrated and recirculated to the synthesis:

WO 99/01206 discloses, for example, a method which separates off suspended catalysts by means of crossflow filtration over a ceramic filter. The formation of troublesome covering layers on the filters is prevented by a high flow velocity.

In CN 1394672 A and CN 1377875 A, reaction medium is taken from a chemical synthesis. The suspension medium is separated off by means of a crossflow filtration and the catalyst is recirculated with the residual suspension medium to the reactor. In this way, the catalyst suspension which is recirculated to the reactor is slowly concentrated to a maximum concentration of 12% by weight of catalyst suspension.

WO 91/16294 presents a method of recovering catalyst in the preparation of ether carboxylic acids by catalytic oxidation. The catalyst is in this case concentrated to up to 30% by weight of the catalyst suspension by means of a crossflow filtration and recirculated to the reactor. It is disclosed that a solubilizer used in the oxidation can aid the filtration, with glycol ethers without hydroxy groups being described as solubilizers.

WO 04/112957 is concerned with the recovery of a homogeneous, if appropriate suspended, catalyst by filtration over a semipermeable membrane. It is stated that monoolefinically unsaturated compounds, which are one component of the reaction medium, can be used as auxiliary in the membrane separation.

JP 5-23680 presents a process for the photooxidative treatment of water, in which a titanium dioxide catalyst is kept within a reactor by means of a filter. Water flowing through the reactor is subjected to UV radiation. The reverse osmosis membrane used for the filtration is cleaned at regular intervals by means of a reverse stream of water. Use of a plurality of these reactors in series is disclosed.

A publication by the mott-corporation, 84 Spring Lane, Farmington, USA of April 1997 describes membrane filters which can be used, either individually or in a parallel arrangement, for retaining catalysts. The catalysts are concentrated in the reaction medium and either recirculated to the reaction medium or removed from the plant during a dead-end filtration by backflushing and discharge of the concentrate. Continuous removal of catalysts is only possible by means of filters used alternately. Further treatment or conditioning of discharged, exhausted catalysts is not described.

The disposal or reuse as material of the completely or partially inactivated catalysts is carried out as a function of their composition. Catalyst suspensions which, owing to the remaining amount of toxic organic solvents or reaction products, are classified as preparations hazardous to health or the environment have to be disposed of or recycled subject to strict safety regulations and accordingly by costly processes. In the case of classification as a preparation hazardous to health or the environment, handling, transport and incineration/ashing, for example, is only possible with considerable safety precautions and/or engineering outlay.

There is accordingly great economic interest in the inactivated catalyst suspensions having only a low residual content of problematical, organic compounds, e.g. the respective organic starting materials, products or solvents. Reducing the concentration of very toxic or carcinogenic (K1+K2) substances to less than or equal to 0.1% even allows classification as preparation hazardous to health or the environment to be completely avoided (see Dangerous Materials Regulations, Directive for Preparations 1999/45/EC). However, a reduction of the residual content of problematical, organic compounds to less than 1% also results in, for example, a reduction in the classification from $T^+$ (very toxic) to $X_n$ (hazardous to health) and thus aids handling.

There is also considerable interest in the inactivated catalysts taken from the respective reactors being obtained directly in a state in which firstly transport and secondly reuse as material or disposal is possible without further conditioning steps or without particular safety measures. In particular, the inactivated catalyst should be free of organic compounds and be present in a nontoxic solvent, preferably water. It is also advantageous for the catalyst to be present in a high concentration.

The methods described in the prior art leave the catalyst in the reaction medium which surrounds it originally. Accordingly, the problem of freeing the catalyst of adhering and possibly hazardous components of the reaction medium possibly or freeing it of the organic solvent has hitherto not been solved. Furthermore, these components can be materials of value whose recovery and work-up is economically advantageous. The catalyst is usually merely concentrated but not in any way prepared for subsequent disposal or work-up, i.e. it is not conditioned. Furthermore, the concentrated catalyst suspension has, in the previous methods, usually been recirculated to a reservoir or directly to the reactor and can therefore not be isolated. Continuous operation of the reactor with simultaneous catalyst discharge and conditioning is impossible as a result.

BRIEF SUMMARY

It was accordingly an object of the present invention to develop a method by means of which catalysts taken off in the total amount or a partial amount (purge) from a suspension-catalyzed reaction can be separated off virtually completely from the reaction medium and be made available in a very high concentration in a liquid nontoxic phase or in a phase which is less critical than the reaction medium. The method should also be able to be used flexibly and the conditioning should be able to be carried out discontinuously or continuously. In particular, the method should allow continuous operation at an essentially unchanged reactor throughput by removal of part of the catalyst-comprising suspension and addition of the amount of active catalyst required in each case, so that costly interruptions for replacement of catalyst can be dispensed with.

Surprisingly, a method of conditioning suspended catalysts makes it possible to provide the inactivated catalysts in a nontoxic solvent or a solvent which is less critical than the reaction medium without appreciable amounts of remaining organic compounds from the reaction medium, in which process at least part of the catalyst-comprising reaction medium is taken from one or more reactors and the suspended, at least partially inactivated catalysts are separated off and purified by means of at least one membrane filtration, with at least one of the membrane filtrations being carried out as a diafiltration.

BRIEF DESCRIPTION OF THE DRAWING

FIG. 1 is a schematic diagram of a filter unit.

DETAILED DESCRIPTION OF THE PREFERRED EMBODIMENTS

The term diafiltration refers to a membrane filtration in which a diafiltration medium is added to the retentate before or during the membrane filtration. The diafiltration medium generally comprises a liquid phase which is different from the previous suspension medium. The addition of the diafiltration medium generally does not alter the concentration of the catalyst. The previous suspension medium is preferably replaced by a different type of suspension medium. The diafiltration medium is preferably miscible without a phase boundary with the previous suspension medium. The diafiltration medium is particularly preferably miscible without a phase boundary with the previous suspension medium in any ratio. Here, miscible without a phase boundary means that no phase boundary, for example in the form of an emulsion, is formed under the prevailing pressure and temperature conditions in each case and at the mixing ratios used.

The term retentate refers to the stream which does not go through the membrane, while the term permeate refers to the stream which goes through the membrane. The resulting mass flow per unit area of the membrane is referred to as permeate flux and is generally reported in $kg/m^2/h$. In accordance with the definition of retentate and permeate, the retentate side is the side of the membrane on which the catalyst suspension is present and the permeate side is, correspondingly, the side of the membrane on which the essentially catalyst-free liquid phase is present.

The term concentration step refers to a filtration after which the catalyst is present in a smaller volume of suspension medium than before the filtration. For example, the suspended catalyst can be concentrated by removing part of the suspension medium via a membrane, with the suspended catalyst remaining in a smaller volume of the suspension medium.

The term membrane filtration refers to microfiltration, also known as crossflow filtration, ultrafiltration or nanofiltration.

The term suspended catalysts refers to catalysts which are present as solid in a liquid phase. The liquid phase can consist of a pure or essentially pure liquid or a mixture of liquids. The liquid phase can, for example in the case of a catalyst-aided reaction, comprise the liquid constituents of the reaction medium such as starting materials, products, solvents or else solvents and dissolved starting material and/or product components. The composition of the liquid phase necessarily changes during the method of the invention.

The term suspension medium refers to the liquid phase in which the suspended catalyst is present.

The term catalyst suspension refers to the totality of the suspension medium and the catalyst suspended therein. It is possible for further solids to be present in addition to the catalyst in the catalyst suspension. Preference is given to the catalyst suspension comprising no further solids.

According to the invention, the catalyst which is to be conditioned by means of the method of the invention is initially present in suspension in a liquid reaction medium. The suspension medium is replaced by carrying out one or more diafiltration steps.

The progress or degree of replacement of the suspension medium is indicated by the replacement coefficient. The replacement coefficient is the amount of permeate taken off or the amount of diafiltration medium introduced (amount of permeate separated off and amount of diafiltration medium introduced are identical in the case of diafiltration) divided by the amount of retentate. The amounts can here be determined either consistently by volume or consistently by weight. The fresh diafiltration medium can be introduced in liquid or solid form. In the case of solid form, it can be present, for example, in a crystalline state or a frozen state and can liquefy or be liquefied while carrying out the method.

After carrying out the method of the invention, i.e. after the last filtration, the catalyst is preferably present in a liquid suspension medium, for example alcohols such as methanol, ethanol, isopropanol and ethylene glycol, ketones such as acetone, ethers such as dioxane, nitriles such as acetonitrile, acid amides such as dimethylformamide and particularly preferably in nontoxic water. If the original suspension medium (reaction medium) is not miscible with water, it firstly has to be replaced by a suspension medium which is miscible both with the original suspension medium and with water and this then has to be replaced by water in a further diafiltration step. Suspension media suitable for this intermediate step are, for example, alcohols such as methanol, ethanol, isopropanol and ethylene glycol, ketones such as acetone, ethers such as dioxane and nitriles such as acetonitrile, acid amides such as dimethylformamide.

The method of the invention accordingly comprises at least one diafiltration step. If it is the intention that the inactivated catalyst be present in water at the end of conditioning and the reaction medium is not miscible with water, preference is given to using from 1 to 3, in particular 1 or 2, diafiltrations.

The method of the invention preferably additionally comprises at least one concentration step, particularly preferably two. The first concentration step is generally carried out before the first diafiltration step. Here, the catalyst is concentrated in the reaction medium. As a result, less diafiltration medium is consumed or permeate is produced in the subsequent diafiltration steps for the required depletion than is the case in direct diafiltration of the unconcentrated catalyst suspension. The second concentration step is generally carried out after the last diafiltration step. Here, final concentration is effected, if appropriate, with the aid of one or more suitable auxiliaries.

During the method, diafiltration and concentration steps can be arranged in series in any suitable number and order.

The optimal number of diafiltration and concentration steps can be determined by a person skilled in the art for the respective catalyst as a function of the type and amount of impurities.

For example, the diafiltration and concentration steps can be estimated as follows: the concentrations c, amounts m and the MC and MA values relate to the continuous fluid phase (suspension medium); the suspended catalyst component is not taken into account. The retention $R=1-(c_{permeate}/c_{retentate})$ is zero (R=0) for the components of the suspension medium since these generally pass unhindered through the membrane. The catalyst is essentially completely held back (R=1).

$X(t)$=value at time t; $X(t=0)$=value at time t=0
Concentration: $c(t)=c(t=0) \times MC(t)^R$
$\quad c(t)=c(t=0)$ [for R=0]
$\quad MC(t)=m(t=0)_{retentate}/m(t)_{retentate}$ [concentration factor]
$\quad Yield_{retentate}=MC(t)^{(R-1)}$
$\quad Yield_{retentate}=MC(t)^{(-1)}$ [for R=0]
Diafiltration: $c(t)=c(t=0) \times e^{-MA(t) \times (1-R)}$
$\quad c(t)=c(t=0) \times e^{-MA(t)}$ [for R=0]
$\quad MA(t)=m(t)_{permeate}/m_{retentate}$ [diafiltration coefficient]
$\quad m_{retentate}$=constant, not time-dependent
$\quad Yield_{retentate}=e^{-MA(t) \times (1-R)}$
$\quad Yield_{retentate}=e^{-MA(t)}$ [for R=0]

In general, the retentate formed in each filtration is passed onto the next filtration. The essentially catalyst-free permeate obtained from each individual filtration can be worked up separately or as collected permeate to recover, for example, product, suspension medium, diafiltration medium and/or auxiliaries. The materials recovered from the individual permeates or the collected permeate, e.g. the diafiltration media, can either be fed back into the membrane filtration unit at a suitable point or can be utilized in another way or be disposed of. Of course, the permeate can also be discarded without further work-up.

The catalyst suspension after the method of the invention has been carried out advantageously has a concentration of problematical components of the reaction medium (impurities such as products, starting materials and/or organic solvents) of less than 1% by weight, based on the suspension, preferably less than 0.5% by weight and in particular less than 0.1% by weight.

After the method of the invention has been carried out, the catalyst suspension advantageously has a catalyst concentration of from 1 to 60%, based on the suspension, preferably from 5 to 50% and in particular from 10 to 40%.

The inactivated catalyst is particularly preferably present in aqueous solution after carrying out the method of the invention.

The membrane filtration process is advantageously carried out as a microfiltration (crossflow filtration), an ultrafiltration or a nanofiltration, depending on the particle size of the catalyst to be conditioned.

Conditioning is advantageously carried out on inactivated catalysts. Inactivated catalysts are catalysts which have, on average, lost at least 0.5%, preferably at least 10%, of their catalytic properties. A person skilled in the art can determine, for example by an analysis of the economics, above what degree of inactivation conditioning should be carried out or, on the basis of the respective catalyst consumption, to what degree continuous conditioning should be carried out. The catalyst consumption is typically in the range from 10 g to 1000 g per metric ton of product.

The method of the invention can be applied to a wide variety of types, grades and sizes of suspendable catalysts. The size of the catalyst can vary within wide limits. Thus, it is possible to use catalysts whose average particle diameters are very small, for example in the nanometer range. It is also possible to use large catalysts having an average particle diameter of, for example, up to 0.5 mm. Catalysts having a particle diameter of from 1 nm to 500 μm, preferably from 2 nm to 100 μm and particularly preferably from 3 nm to 50 μm, can usually be conditioned by the method of the invention. The value indicated for the particle diameter is the $d_{50.0}$ value which indicates that 50% of the particles are smaller and 50% of the particles are larger than the stated value. If the particles are present in aggregates, the diameter of the aggregates is used instead of the particle diameter. Methods of determining the $d_{50.0}$ value are known to those skilled in the art.

The active composition of the catalyst generally comprises one or more elements of transition groups I. to VIII. of the IUPAC Periodic Table of the Elements. Preference is given to copper, chromium, molybdenum, iron, nickel, platinum, palladium, manganese, rhodium, ruthenium, cobalt, iridium, vanadium, osmium, silver, zinc, cadmium, tungsten or a mixture of these elements. Particular preference is given to catalysts comprising at least one element selected from among copper, cobalt, iron, nickel, rhodium, iridium, ruthenium, platinum or palladium. The metal content of the catalysts is generally in the range from 0.1 to 100% by weight, preferably in the range from 0.2 to 95% by weight, particularly preferably in the range from 0.5 to 95% by weight, based on the total weight of the catalyst.

The active composition of the catalyst preferably further comprises at least one element selected from among the elements of main groups II., III., IV. and VI, transition groups II., III., IV. and V. of the Periodic Table of the Elements and the lanthanides as promoter to increase the activity. The promoter content of the catalyst is generally up to 5% by weight, preferably in the range from 0.001 to 5% by weight, particularly preferably in the range from 0.01 to 3% by weight. The promoter content of a catalyst is determined by an analytical method which is determined by the type of promoter used.

The catalysts can be all-active or supported catalysts. All-active catalysts, which consist essentially of active composition, are particularly preferably catalysts of the Raney®, metal sponge, metal oxide or metal oxide hydrate type. Examples of such catalysts are Raney® nickel, Raney® copper, Raney® cobalt, Raney® nickel/molybdenum, Raney® nickel/copper, Raney® nickel/chromium, Raney® nickel/chromium/iron, iron oxide, cobalt oxide or metallic rhodium sponge. In the case of supported catalysts, the active composition is deposited on the surface of solid support particles or on the surface and/or in the interior of a porous support particle. Examples are catalyst supports composed of oxide ceramics or carbon doped with metals such as platinum, palladium, nickel or other active compositions.

The production of catalysts is known to those skilled in the art and can be carried out by methods known to those skilled in the art.

The method of the invention can be used for conditioning suspended catalysts in order to recover the materials present which are used in various catalyst-aided reactions. The following table lists, merely by way of example, some of the reactions, for example hydrogenations, oxidations, isomerizations and hydroisomerizations, and the catalysts which are preferably used in the respective reactions.

| Example reaction | Catalysts which are preferably used in this case |
|---|---|
| Hydrogenations of C—C multiple bonds | Noble metals on supports such as carbon or ceramic, Raney ® nickel |
| Hydrogenations of nitro compounds to amines | Noble metals on supports such as carbon or ceramic, Raney ® nickel or cobalt |
| Hydrogenations of aromatics to cycloaliphatics | Ru, Rh on carbon supports, Raney ® nickel |
| Hydrogenations of nitriles to amines | Ru on supports such as carbon and Raney ® nickel or cobalt |
| Selective hydrogenations (in the presence of double bonds) of aldehydes to alcohols | Noble metals such as Ru or Pt on carbon supports |
| Selective hydrogenations of alkynes to alkenes | Pd on carbon supports |
| Selective hydrogenations of olefinic double bonds, including in the presence of aromatic structures | Noble metals such as Pd on carbon supports |
| Selective hydrogenations of aromatics in the presence of hydrogenatable functional groups such as epoxide structures | Ru or Rh on carbon supports |
| Aminative hydrogenations of carbonyl functions to form primary, secondary and tertiary amines | Noble metals on supports such as carbon or ceramic, Raney ® nickel or cobalt |
| Oxidations of hydrogen to $H_2O_2$ | Pt and Pd on ceramic supports |
| Oxidations of primary alcohols to aldehydes, secondary alcohols to ketones | Pt, Pd or Ru on carbon or $Al_2O_3$ supports |
| Oxidations of primary alcohols to carboxylic acids | Pt or Pd on carbon or $Al_2O_3$ supports |
| Isomerizations of double bonds | Zeolites |
| Hydroisomerizations of double bonds | Poisoned hydrogenation catalysts |

The method of the invention is advantageously carried out by taking all or part of the catalyst-comprising reaction medium continuously or discontinuously from one or more reactors. The method of the invention is preferably carried out continuously. Possible reactors can be, for example, stirred reactors, loop reactors, bubble column reactors or modifications or combinations of these.

A person skilled in the art can determine the optimum size of the portion to be taken off, for example from the catalyst consumption per metric ton of product and with the aid of an analysis of the economics.

The catalyst suspension taken off can, after it has been taken off, be filtered in a membrane filtration unit which is connected in a fixed manner for at least part of the time to a reactor. The membrane filtration unit can be made up of only one filtration unit element or a plurality of filtration unit elements but comprises at least one membrane filter. It generally runs from one or more reactors to the offtake point of the conditioned catalyst.

The chosen number and type of filtration unit elements can be matched by a person skilled in the art to the respective needs. In this way, it is possible to obtain membrane filtration units having a complex structure. Preference is given to simple and therefore cheap membrane filtration units. For the purposes of the present invention, filtration unit elements are each a detachable part of the membrane filtration unit which performs a function in the membrane filtration unit. The individual filtration unit elements comprise, for example, pipe and/or hose connections, seals, pressure and temperature meters and regulators, pumps, valves, filters and also feed lines and discharge lines. An appropriate membrane filtration unit can comprise one, more than one or all of the elements mentioned by way of example, with one or more of each being present in a suitable embodiment and order. The membrane filtration unit can also comprise parallel lines, filters and filtration paths which can be operated simultaneously or alternately.

The membrane filters used comprise a filter housing which is stable under the respective conditions of the filtration. Such conditions are, for example, pressure, temperature or the type and composition of catalyst suspension. A filter housing can comprise one or more membranes. A filter housing is a vessel comprising one or more membranes in a suitable orientation and can be connected in a fixed manner for at least part of the time to one or more other filtration unit elements. The membrane can be fixed permanently in the filter housing or can be removable. The membrane can have a flat, disk-like, tubular, capillary or rolled geometry. Depending on the area needed, a filter can comprise a plurality of membranes arranged in parallel or in series. In a preferred embodiment, use is made of a ceramic membrane which is preferably inserted with the aid of elastomer seals in a metal filter housing or a metal membrane which is preferably fixed in the filter housing. The ceramic membrane preferably has a tubular or multichannel geometry and the metal membrane preferably has a tubular geometry.

A membrane generally comprises only one separation layer (homogeneous self-supporting membrane) or a separation layer and at least one support structure (multilayer composite membrane). The use of a thin separation layer which is not mechanically stable on a single-layer or multilayer porous support structure generally increases the permeate flux and ensures mechanical strength of the membrane. This support structure can consist of the same material as the separation layer or of at least one different material. It generally has coarser pores than the separation layer.

Possible material combinations of separation layer and support structure can be, for example: metal-metal, ceramic-metal, ceramic-ceramic, ceramic-carbon, polymer-polymer, polymer-metal, polymer-ceramic, polymer-ceramic on metal, carbon-carbon, carbon-metal, carbon-ceramic. Homogeneous, self-supporting membranes based on polymers, carbon, ceramic or metal can also be used.

As organic separation layer and/or support structure materials, it is possible to use, for example, polytetrafluoroethylenes, polyvinylidene fluorides, polyethylene, polypropylene, polysulfones, polyether sulfones, polyether ketones, polyamides, polyesters, polyacrylonitriles, regenerated celluloses, silicones, polyimides or materials having an equivalent function.

Examples of inorganic separation layer and/or support structure materials are: $\alpha$-$Al_2O_3$, $\gamma$-$Al_2O_3$, $ZrO_2$, $TiO_2$, SiC, mixed ceramic materials, stainless steel, nickel, metal alloys and carbon. Examples are (MF=microfiltration membrane, UF=ultrafiltration membrane, NF=nanofiltration membrane):

| Manufacturer | Membrane | Separation limit (kD) Pore diameter (nm or µm) |
|---|---|---|
| Atech innovations GmbH. | UF/$TiO_2$ on $\alpha$-$Al_2O_3$/1, 2 | 20 kD |
| | UF/$TiO_2$ or $ZrO_2$ on $\alpha$-$Al_2O_3$/1, 2 | 50 nm |
| | MF/$\alpha$-$Al_2O_3$ on $\alpha$-$Al_2O_3$/1, 2 | 0.1; 0.2; 0.4; 0.8; 1.2 µm |
| Rhodia/Orelis | MF/$ZrO_2$ or $TiO_2$ on ceramic/1, 2 | 0.1; 0.2; 0.45; 0.8 µm |
| | UF/$ZrO_2$ or $TiO_2$ on ceramic/1, 2 | 15, 50, 150; 300 kD |
| | UF/$ZrO_2$—$TiO_2$ on carbon/1 | 50; 150; 300 kD |
| | MF/$ZrO_2$—$TiO_2$ on carbon/1 | 0.14 µm |
| Graver Technologies | UF/$TiO_2$ on steel/1 | 100 nm |
| GKN Sinter Metals | MF/metal on metal/1, 3 | 0.3-1 µm |
| Microdyn NADIR GmbH. | UF/polyether sulfone or polysulfone/3 | 10-150 kD |
| | UF/polyether sulfone/1 | 40, 100 kD |
| | MF/polyethylene or polypropylene, self-supporting without support structure/1 | 0.2 and 1 µm |
| Creavis | UF/$ZrO_2$ on $\alpha$-$Al_2O_3$ and metal/3 | 25, 80 nm |
| GE-Osmonics | UF/polysulfone/3 | 40 nm |
| | UF/PVDF/3 | 10 kD |
| | MF/PVDF/3 | 300 nm |
| Pall Schumacher | UF/$TiO_2$ or $ZrO_2$ on ceramic/1, 2 | 5, 10 and 50 nm |
| | MF/$\alpha$-$Al_2O_3$ on ceramic/1, 2 | 100 and 200 nm |
| Inocermic | NF/$TiO_2$ on ceramic/1, 2 | 0.9 nm |
| | UF/$ZrO_2$ on ceramic/1, 2 | 3 nm |
| Saint-Gobain | MF/SiC on SiC/1, 2 (SiC = recrystallized SiC) | 250, 500, 800, 1500, 3000 nm |

1: tubular membrane;
2: multichannel element;
3: flat membrane for rolled, pocket, stacked plate or special modules having a moved membrane or stirring devices between the membranes The pore diameter of the separation layer generally depends mainly on the respective size of the smallest catalyst particles. When a suitable pore size of the separation layer is selected, catalyst losses due to turbid outflow can be disregarded. For the purposes of the present invention, the term turbid outflow refers to catalyst particles which can pass through the membrane in the case of a badly chosen pore size of the separation layer and therefore appear in the permeate. This turbid outflow and associated blocking of the filtration medium occurs to an increased extent when using classical filtration processes for removal of solids, e.g. using filter presses, pressure filters, candle filters, centrifuges and disk filters, and also for concentrating solids, e.g. using separators, centrifuges and decanters. This problem is particularly evident in the case of catalyst particles having a $D_{50.0}$ of <50 µm, since the catalyst particles are usually attrited in industrial reactors and particle fractions having a diameter of significantly below 1 µm are formed, and naturally in the case of very finely divided catalysts having a $D_{50.0}$ of <1 µm. Ideally, these catalyst losses are avoided completely when membranes having appropriate pore sizes are used.

Depending on the size distribution of the catalyst particles, the separation layers used preferably have a pore diameter in the range from 0.5 nm to 10 µm, in particular in the range from 1 nm to 5 µm and preferably in the range from 2 nm to 2 µm. The pore size of the separation layer should advantageously be smaller than the size of the smallest catalyst particles. If the catalyst particles are present in aggregated form, the preferred pore size depends not on the size of the smallest catalyst particles but on the size of the smallest aggregates. The reported pore size of the separation layer is generally based on the diameter for which 90% of the pores are smaller than the pore size indicated. The separation layer of the membrane is the layer of the membrane comprising the smallest pores of the membrane. The pore size or the separation limit of the membranes is determined by methods known to those skilled in the art.

When choosing the membrane, it is necessary to take account not only of the pore size of the separation layer and the size distribution of the catalyst particles, but also of the filtration conditions such as the composition of the suspension medium or the liquid phase, the pressure conditions, the temperature and any auxiliaries present. A suitable membrane advantageously does not change its separation properties, i.e. its separation limit, significantly under any of the factors mentioned by way of example.

The separation limit in kD is the molecular weight of a dissolved test substance which has a retention (R) of 90%. Here, R is 1 minus the concentration in the permeate, divided by the concentration in the retentate.

The correlation between separation limit in kD and the pore diameter is known to those skilled in the art. Thus, for example, pore sizes of from 2.0 to 1.2 µm are used for molecular weights greater than 1000 kD, pore sizes of 0.6 µm are used for 1000 kD, 0.2 µm is used for 400 kD, 0.1 µm is used for 200 kD, 0.05 µm is used for 100 kD, 0.01 µm is used for 20 kD and 0.05 µm is used for 10 kD.

In the method of the invention, the conditions of the filtration, e.g. pressure, temperature or flow velocity, can be selected independently of the conditions in the reaction system if required. This independence allows the conditions to be optimized for the respective filtration. For example, the temperature and/or the pressure can be increased or decreased, the flow velocity can be selected optimally, the suspension medium can be replaced and/or the properties and composition of the retentate and/or permeate can be optimized by addition of auxiliaries. A person skilled in the art can choose the filtration conditions which are optimal in each case. Further information on this subject may be found in the technical literature.

The filtration can be carried out at various pressures and can be individually selected and optimized for each filtration of the method. Thus, they can be identical to or different from the pressures during a preceding or subsequent filtration and can change or be altered for each filtration of the method even during the filtration.

Various pressures, which are given different names, generally prevail in a filter during a filtration. The permeate pressure is the pressure on the permeate side of the membrane and the retentate pressure is the pressure on the retentate side of the membrane. The filtration can be carried out at a retentate pressure in the range from 1 to 100 bar, preferably in the range from 1 to 50 bar. The transmembrane pressure is the retentate-side arithmetic mean of the pressures at the inlet to the filter and at the outlet from the filter, reduced by the permeate pressure. It can likewise be optimized for each filtration and be identical to or different from the transmembrane pressure in other filtrations of the method. The transmembrane pressure can be, for example, in the range from 0.1 bar upward, in particular in the range from 0.2 to 50 bar and preferably in the range from 0.5 to 25 bar. The pressure conditions to be selected are essentially dependent on the type of membrane, the diameter of the pores of the membrane, the catalyst concentration, the hydrodynamic conditions in the membrane module and the mechanical stability of all filtration unit elements. Higher transmembrane pressures generally lead to higher permeate fluxes. The pressure required can be generated by pumping and/or by gravity.

The temperature can be selected and optimized independently for each filtration carried out during the method of the invention. Higher temperatures generally lead to higher permeate fluxes. It can consequently be identical to or different from the temperature in the preceding and/or subsequent filtration step. The value chosen depends mainly on the solubilities and the melting and boiling points of the respective materials present under the pressure conditions prevailing in each case. It is possible to choose temperatures in the range from 0 to 200° C., advantageously in the range from 10 to 180° C., preferably in the range from 20 to 150° C. and particularly preferably in the range from 30 to 120° C.

In a filtration, the conditions are preferably set so that only a thin or not noticeable covering layer is formed on the membrane. Covering layers comprise solid material or a gel which deposits on and/or in the membrane and can adversely affect the filtration. This material can be any solid material or gel which is present in the catalyst suspension. For example, it can comprise the catalyst. Gel-like deposits are formed, for example, from high molecular weight dissolved components which are retained by the membrane and can thus accumulate on the membrane. In the case of filters and membranes having a flat or disk-like membrane geometry, stirring and/or shearing elements and/or movements of the membrane or of the filter, for example by means of rotation or vibration modules, can also be used for preventing covering layers. Furthermore, a high flow velocity of the catalyst suspension and associated shear at the membrane surface can be used. In general, a flow velocity in the range from 0.2 to 20 m/s is selected. The appropriate flow velocity depends on the filter used and the membrane used.

Filters and membranes having a rolled geometry are preferably used at a flow velocity in the range from 0.2 to 2 m/s. Filters and membranes having a tubular geometry are used at a preferred flow velocity in the range from 1 to 6 m/s. Rotary filters are preferably used at a flow velocity in the range from 5 to 20 m/s.

If a plurality of possibly different filters are used, the flow velocity can be matched to the respective filter.

A person skilled in the art will have available suitable means of measuring and controlling the flow velocities. To remove covering layers, the method of the invention also allows flow reversal, which can be brought about by increasing the permeate pressure above the retentate pressure (permeate backflushing).

The above-described measures for reducing or preventing covering layers can be used individually, in combination or alternately. Covering layers can be influenced in each filter of the membrane filtration unit by means of identical or different measures or identical or different combinations of measures.

A further preferred embodiment of the method of the invention comprises addition of one or more suitable auxiliaries. For the purposes of the invention, the term auxiliary refers to all solid, liquid or gaseous materials which are added to the catalyst suspension before or during filtration and are suitable for positively influencing the filtration. The filtration can, for example, be influenced favorably by lowering the viscosity. Likewise, an auxiliary or a plurality of auxiliaries can be used for stabilizing the catalyst suspension. Here, stabilization of the catalyst suspension can relate to physical parameters such as the settling velocity of the catalyst particles and/or chemical parameters such as the pH. The use according to the invention of at least one auxiliary enables, for example, higher final concentrations of the catalyst in the retentate to be achieved. For the purposes of the present invention, the final concentration of the catalyst is the catalyst concentration at which no further increase in the catalyst concentration in the retentate is possible under the filtration conditions selected.

At higher catalyst concentrations on the retentate side in particular, it is possible to achieve higher specific permeate fluxes when using one or more auxiliaries than when the auxiliary or auxiliaries is/are not used. When one or more auxiliaries is/are used at low catalyst concentrations in the retentate, it is possible for lower permeate fluxes than without the use of the auxiliary or auxiliaries to occur. The catalyst concentration in the retentate above which higher permeate fluxes are achieved when using the auxiliary or auxiliaries than without the use of the auxiliary or auxiliaries is referred to as the limit concentration.

It is likewise possible to use one or more auxiliaries to prevent deposits within the membrane filtration unit and thus increase the maintenance intervals and the life of the membrane filtration unit. Such deposits can, for example, comprise individual materials or mixtures of materials or constituents originally present in the catalyst suspension, e.g. reaction products, starting materials or inorganic salts. They can also be formed or added while carrying out the method.

It is advantageous to carry out at least one filtration in the presence of at least one auxiliary selected from the group consisting of surfactants, wetting agents and dispersants. Suitable auxiliaries are in principle ionic and nonionic molecular and polymeric compounds which have a favorable effect on the filtration properties of suspended catalysts.

Suitable auxiliaries are, for example, nonionic molecular or polymeric surfactants or dispersants such as ethoxylated fatty alcohols, polyethylene glycol-polypropylene glycol block polymers whose properties can be adjusted via the size of the polyethylene glycol or polypropylene glycol blocks.

Further suitable auxiliaries are ionic molecular or polymeric surfactants or wetting agents or dispersants which bear, for example, carboxyl groups, sulfonic acid groups, phosphonic acid groups, quaternary ammonium groups. These include, for example: $C_{12}$-$C_{18}$-alkylsulfonic acids and their salts, alkylbenzenesulfonic or alkylnaphthalene-sulfonic acids or their salts, e.g. dodecylbenzenesulfonic acid.

Polycarboxylic acids or salts thereof based on at least one α,β-unsaturated carboxylic acid, for example acrylic acid, methacrylic acid, dimethacrylic acid, ethacrylic acid, maleic acid, citraconic acid, methylenemalonic acid, crotonic acid, isocrotonic acid, fumaric acid, mesaconic acid and itaconic acid. Preference is given to using polyacrylates based on acrylic acid, methacrylic acid, maleic acid or mixtures thereof. Further suitable copolymerizable compounds are N-vinylcaprolactam, N-vinylimidazole, N-vinyl-2-methylimidazole, N-vinyl-4-methylimidazole, vinyl acetate, vinyl propionate, isobutene and styrene.

Polyvinylphosphonic acids and polymeric amines based on hydrolyzed polyvinylformamide or ethylenimine are also suitable. Further suitable copolymerizable compounds are N-vinylcaprolactam, N-vinylimidazole, N-vinyl-2-methylimidazole, N-vinyl-4-methylimidazole, vinyl acetate, vinyl propionate, isobutene and styrene.

Examples of suitable auxiliaries are:

| Material | Average molecular weight | Trade names of BASF Aktiengesellschaft |
|---|---|---|
| Naphthalenesulfonic acid-formaldehyde condensate Na salt | 20 kD | Tamol ® NH 7519 |
| Maleic acid-olefin copolymer Na salt | 12 kD | Sokalan ® CP 9 |
| Modified polyacrylic acid Na salt | 4 kD | Sokalan ® CP 10 |
| Block copolymer (10% PEG): PEG—PPG—PEG | 2 kD | Pluronic ® 6100 |
| Block copolymer (50% PEG): PEG—PPG—PEG | 6.5 kD | Pluronic ® 10500 |
| Block copolymer (80% PEG): PEG—PPG—PEG | 8 kD | Pluronic ® 6800 |

PEG = Polyethylene glycol,
PPG = Polypropylene glycol

Suitable auxiliary concentrations, based on the catalyst, are in the range from 0.1 to 50% by weight, preferably from 0.2 to 40% by weight, particularly preferably from 0.25 to 30% by weight and in particular from 0.5 to 20% by weight.

The type and concentration of suitable auxiliaries depends on the conditions in each case and has to be optimized for each filtration. Information about the properties of possible auxiliaries is known to those skilled in the art or can be obtained from appropriate data banks and/or technical literature.

In one embodiment, the surfactants or dispersants Tamol® NH 7519, Sokalan® CP 9 and Puronic® 6100 are preferred for carbon-supported catalysts (e.g. noble metal on Norit® SX) in water. In the case of other supported catalysts, for example those based on oxide ceramics, or all-active catalysts such as Raney® Ni, or solvents other than water, other surfactants or dispersants can be advantageous.

The present invention accordingly also provides for use of surfactants, wetting agents and/or dispersants in the conditioning of suspended catalysts, in particular for reducing the viscosity, stabilizing the catalyst suspension and/or preventing deposits within the membrane filtration unit, resulting in the advantage that significantly higher final concentrations can be achieved. Preference is therefore given to using them in the last filtration step, e.g. in the final concentration step.

The method of the invention can be operated continuously or discontinuously. In discontinuous operation, the catalyst suspension taken from the reaction system is placed in a vessel which functions as circulation vessel in a pumped circuit into which one or more filters are integrated. The catalyst suspension can be circulated by pumping, permeate can be taken off and, if appropriate, liquid or solid materials such as auxiliaries or suspension media can be introduced at a suitable point in the pumped circuit. Points which are suitable for this purpose are, for example, lines or vessels upstream of filters or else the filters themselves. The catalyst suspension is circulated by pumping until the desired concentration of the catalyst and/or the desired composition of the suspension medium has been achieved. Thus, for example, the catalyst concentration can be altered by removing liquid constituents by filtration or by adding some or all constituents of the suspension medium in the same or different composition. Furthermore, qualitative changes can be produced by, for example, altering the chemical or physical properties of the catalyst suspension, e.g. pH or viscosity, by addition of one or more auxiliaries. Furthermore, parameters such as temperature or pressure can be altered. These changes can in each case be carried out alone or in combination.

When the method is carried out continuously, the catalyst suspension taken from the reaction system is passed once through or along one or more filters of the membrane filtration unit. Here, all the measures mentioned by way of example above for altering the concentration of the catalyst or the concentration or properties of the catalyst suspension can be used either alone or in combination.

Furthermore, the catalyst can advantageously be taken from one or more continuously operated reactors.

In summary, the conditioned exhausted catalyst can be taken off as catalyst suspension, preferably an aqueous catalyst suspension, particularly preferably as a catalyst suspension consisting essentially of catalyst and water and also, if applicable, added dispersant or surfactant from the membrane filtration unit after the last filtration and be worked up and/or disposed of either directly or after drying.

The present invention accordingly provides a simple and inexpensive method of conditioning and discharging exhausted suspended, in particular finely divided catalysts which can be used in a versatile fashion in all preferably continuously operated suspension-catalyzed reactions.

The method of the invention is particularly advantageous when the filter or filters which keep catalyst in the reaction system and generate an ideally catalyst-free filtrate are membrane filters, e.g. microfilters, crossflow filters, ultrafilters or nanofilters, which are preferably able to retain particularly finely divided catalysts or attrited catalyst fractions having, for example, catalyst particles having a $D_{50.0}$ of <5 μm which can form in corresponding reactors.

Compared to existing methods of discharging catalyst, the invention has the particular advantage that the filtration conditions can be selected independently of the conditions in the reactor and be optimized for efficient conditioning. This applies both to parameters such as catalyst concentration, diafiltration medium, pressure, flow and temperature and also parameters such as membrane material, membrane area, surface tension or ionic strength of the catalyst suspension, of the retentate and/or of the permeate. When the parameters are optimally selected in the method of the invention, the method allows the use of smaller filtration units than in conventional methods, which reduces the resulting costs for the procurement and regular replacement of the filter units. Furthermore, the method allows essentially loss-free conditioning of exhausted catalysts. Likewise, the membrane filtration unit can be attached, for example, to a reactor and thus makes it possible for completely or partially inactivated catalyst to be taken continuously or discontinuously from the reactor. This makes it possible to operate a reactor continuously with constant or approximately constant performance and thus avoid costly interruptions of the reaction.

The element of diafiltration makes it possible to take the catalyst in high purity in any desired suspension medium from the membrane filtration unit. If a suspension medium which is not harmful to the health of human beings and animals and to the environment is selected, this aids handling of the catalyst and enables the catalyst to be prepared for subsequent work-up to recover material or disposal.

Description of FIG. 1

FIG. 1 shows a sketch of a filter unit. The filter unit comprises a pumped circuit comprising a circulation vessel (K), a pump (Pu1), a thermostat (Th), a membrane filter (M), valves (V1, V2, V3) and also pressure regulating valves (D1, D2). A temperature meter (T), a flow meter (F1) and a pressure gauge (P1) are integrated into the circuit upstream of the membrane filter. In addition to the pumped circuit, the filter unit comprises a reservoir (Vb) for the diafiltration medium which can be metered into the circulation vessel (K) by means of a pump (Pu2). The pressure of the retentate downstream of the membrane filter is measured by means of a pressure gauge (P2) and is measured by means of a pressure gauge (P3) and regulated by means of a pressure regulating valve (D2). The permeate flow downstream of the membrane filter (M) is measured by means of a flow meter (F2). Permeate obtained can be discharged via a permeate outlet (A) into a permeate container (B) and weighed by means of a balance (W).

EXAMPLES

The examples of conditioning of catalyst suspensions by means of membrane filtration were carried out using a filter unit as shown in FIG. 1.

Various membrane filters were used in the membrane filtration unit. For example, membrane filters having ceramic single-channel tubes (external diameter=10 mm, internal diameter=6-7 mm, length=1000 mm) having different separation limits were used. The average flow velocity of the catalyst suspension in the membrane filter was set to from 1 to 6 m/s, the transmembrane pressure was set to from 0.5 to 4 bar and the temperature was, depending on the filtration, set to from 40 to 90° C. In general, the catalyst suspension was introduced into the circuit and the membrane filtration unit was operated with the permeate outlet (A) closed. If the catalyst concentration was to be increased, permeate was taken from the membrane filtration unit via the permeate outlet (A). In the case of diafiltration, permeate was taken from the membrane filtration unit and diafiltration medium was introduced in an amount corresponding to the amount of permeate taken off. Auxiliaries, for example a surfactant or wetting agent or dispersant, were optionally added to the catalyst suspension.

The percentages by weight (% by weight) reported in the examples are based on the total weight of the catalyst suspension, unless indicated otherwise.

Example 1

A reaction medium from a suspension-catalyzed double bond hydrogenation (hydrogenation of 3-[4-t-butylphenyl]-2-methylpropenal to 3-[4-t-butylphenyl]-2-methyl propanal) comprising about 3% by weight of suspended catalyst (Pd on carbon as support), about 50% by weight of hydrogenation product and about 47% by weight of methanol was subjected to a three-stage concentration and diafiltration process. For this purpose, the above-described reaction medium was subjected at 40° C., a transmembrane pressure of 1 bar and a flow velocity of 4 m/s to filtration over an $Al_2O_3$ membrane from Atech Innovations having a pore diameter of 100 nm.

In the first step, the catalyst was concentrated in the reaction medium from about 3% by weight to about 20% by weight using an average permeate flux of about 60 kg/m²/h. In the second step, the reaction medium was replaced by methanol at a constant catalyst concentration with an exchange coefficient of 3. In the third step, the methanol was, likewise at a constant catalyst concentration, replaced by water with an exchange coefficient of 3. This gave a catalyst suspension in water having a catalyst concentration of 20% by weight and a product concentration of about 0.2% by weight. The permeate fluxes measured in the three steps are shown in the following tables.

Step 1 (Concentration):
at 1 bar and 40° C.

| Concentration % by wt. | Permeate flux [kg/h * m²] |
| --- | --- |
| 2.8 | 86 |
| 8.3 | 72 |
| 9.3 | 70 |
| 17.7 | 68 |
| 15.8 | 65 |
| 20.0 | 63 |
| 20.2 | 23 |

Step 2 (Diafiltration Using Methanol):
at 1 bar, 40° C. and a catalyst concentration of about 20% by weight

| Exchange coefficient | Permeate flux [kg/h * m²] |
| --- | --- |
| 0.0 | 23 |
| 0.2 | 28 |
| 0.6 | 51 |
| 1.5 | 87 |
| 2.3 | 151 |
| 2.9 | 189 |
| 3.0 | 190 |

Step 3 (Diafiltration Using Water):
at 1 bar, 40° C. and a catalyst concentration of about 20% by weight

| Exchange coefficient | Permeate flux [kg/h * m²] |
| --- | --- |
| 0.0 | 190 |
| 0.1 | 58 |
| 1.3 | 81 |
| 1.6 | 130 |
| 2.5 | 166 |
| 3.8 | 174 |

Example 2

A reaction medium from a suspension-catalyzed hydrogenation of an aldehyde to the alcohol (hydrogenation of citral to geraniol/nerol) comprising about 6% by weight of suspended catalyst (Ru on carbon as support), about 70% by weight of hydrogenation product, about 6% by weight of dissolved auxiliary base and about 18% by weight of methanol (solvent) was subjected to a two-stage diafiltration process. For this purpose, the above-described reaction medium was subjected at 60° C., a transmembrane pressure of 1 bar and a flow velocity of 4 m/s to a filtration over an $Al_2O_3$ membrane from Atech Innovations having a pore diameter of 100 nm.

Firstly, the reaction medium was replaced by methanol at a constant catalyst concentration with an exchange coefficient of 3. This resulted in an increase in the permeate flux from about 80 kg/m$^2$/h to about 240 kg/m$^2$/h and the product concentration based on the suspension decreased from about 70% by weight to about 2.9% by weight. The methanol was then replaced at a constant catalyst concentration by water, likewise with an exchange coefficient of 3. This resulted in an increase in the permeate flux from about 240 kg/m$^2$/h to about 460 kg/m$^2$/h and the product concentration based on the suspension decreased from about 2.9% by weight to about 0.1% by weight. This gave an about 6% strength by weight catalyst suspension in water which comprised only about 0.1% by weight of product.

Step 2 (Concentration in Water):

| Catalyst concentration (% by wt.) | Permeate flux (kg/m$^2$/h) |
|---|---|
| 5.4 | 680 |
| 7.8 | 600 |
| 9.5 | 500 |
| 16.2 | 380 |
| 22.3 | 290 |
| 26.4 | 200 |
| 29.1 | 190 |

|  | Flow measurement in the reaction medium |  | Flow measurement in methanol |  | Flow measurement in water |
|---|---|---|---|---|---|
| Transmembrane pressure (bar) | 1 | Replacement of the reaction medium by methanol (diafiltration with exchange coefficient = 3 | 1 | Replacement of the methanol by water (diafiltration with exchange coefficient = 3) | 1 |
| Pressure drop to retentate (bar) | 0.42 | | 0.31 | | 0.40 |
| Temperature (° C.) | 60 | | 60 | | 60 |
| Flow over membrane (m/s) | 4 | | 4 | | 4 |
| Catalyst content (%) | 6.1 | | 5.9 | | 5.6 |
| Permeate flux (kg/m$^2$/h) | 82 | | 241 | | 456 |

Example 3

A reaction medium from a suspension-catalyzed hydrogenation of a nitroaromatic (hydrogenation of dinitrotoluene to diaminotoluene) comprising about 5% by weight of suspended catalyst (Ni on ZrO$_2$ support), about 60% by weight of hydrogenation product and about 35% by weight of water was used in the membrane filtration process. For this purpose, the above-described reaction medium was subjected at 80° C., a transmembrane pressure of 1 bar and a flow velocity of 4 m/s to a filtration over an Al$_2$O$_3$ membrane from Atech Innovations having a pore diameter of 100 nm.

Firstly, the reaction medium was replaced by water at a constant catalyst concentration with an exchange coefficient of 5. This resulted in an increase in the permeate flux from about 190 kg/m$^2$/h to about 680 kg/m$^2$/h and the product concentration based on the suspension decreased from about 60% by weight to about 0.3% by weight.

The catalyst was then concentrated from about 5% by weight to about 30% by weight. This resulted in a decrease in the permeate flux from about 680 kg/m$^2$/h to about 180 kg/m$^2$/h. This gave an about 30% strength by weight catalyst suspension in water which comprised only about 0.3% by weight of reaction product.

Step 1 (Diafiltration):

| Exchange coefficient | Permeate flux (kg/m$^2$/h) |
|---|---|
| 0.0 | 190 |
| 0.5 | 330 |
| 1.1 | 470 |
| 1.9 | 595 |
| 2.2 | 600 |
| 3.2 | 650 |
| 4.1 | 660 |
| 5.0 | 675 |

Example 4

A reaction medium from a suspension-catalyzed hydrogenation of a nitrile (hydrogenation of adiponitrile to hexamethylenediamine) comprising about 25% by weight of suspended catalyst (Raney® Ni) and about 75% by weight of hydrogenation product was subjected to a two-stage diafiltration and concentration process. For this purpose, the reaction medium was subjected at 60° C., a transmembrane pressure of 1.5 bar and a flow velocity of 4 m/s to a filtration over an Al$_2$O$_3$ membrane from Atech Innovations having a pore diameter of 100 nm.

In the first step, the reaction medium was replaced by water at a constant catalyst concentration with an exchange coefficient of 5. This resulted in an increase in the permeate flux from 60 kg/m$^2$/h to 1600 kg/m$^2$/h and a decrease in the product concentration based on the suspension from about 75% by weight to about 0.1% by weight. In a second step, the catalyst was concentrated from about 25% by weight to about 40% by weight. This resulted in a decrease in the permeate flux from 1600 kg/m$^2$/h to 1200 kg/m$^2$/h. This gave an about 40% strength by weight catalyst suspension in water which comprised only about 0.1% by weight of hydrogenation product.

Example 5

The suitability of various auxiliaries in combination with various types of catalysts and various suspension media can be determined by measuring the viscosity. Here, a decrease in the viscosity on addition of the auxiliary to be tested to the catalyst suspension indicates a high degree of suitability of the auxiliary.

The viscosity was measured as a function of the concentration of the auxiliary for 17% strength by weight Norit SX-water suspensions at a temperature of 40° C. Norit SX is a typical carbon support for noble metal catalysts and is therefore suitable for simulating a catalyst. The Norit SX used had an average diameter of about 50 µm. The amount of Norit SX in the suspension was set to 17% by weight, based on the total weight of the suspension.

As auxiliary, use was made of the following products from BASF Aktiengesellschaft:

| | |
|---|---|
| Tamol ® NH 7519 | (naphthalenesulfonic acid-formaldehyde condensate Na salt), |
| Sokalan ® CP 9 | (maleic acid-olefin copolymer Na salt), |
| Sokalan ® CP 10 | (modified polyacrylic acid Na salt), |
| Pluronic ® 6100 | (block polymer comprising 10% of PEG: PEG-PPG-PEG) |
| Pluronic ® 10500 | (block polymer comprising 50% of PEG: PEG-PPG-PEG) |
| Pluronic ® 6800. | (block polymer comprising 80% of PEG: PEG-PPG-PEG) |

PEG = polyethylene glycol,
PPG = polypropylene glycol

The viscosity was determined using a Viscotester VT01 from Hacke.

| Pluronic ® 6100 | | | | |
|---|---|---|---|---|
| Weight used | | Weight | per kg of | |
| Norit SX [g] | Water [g] | used [g] | Norit SX [g/kg] | Viscosity [mPa * s] |
| 80.0 | 390.6 | 0.00 | 0.0 | 23.0 |
| 80.0 | 390.4 | 0.14 | 1.8 | 20.6 |
| 80.0 | 390.1 | 0.54 | 6.7 | 19.9 |
| 80.0 | 389.0 | 1.54 | 19.3 | 18.4 |
| 80.0 | 388.9 | 1.65 | 20.7 | 17.2 |
| 80.0 | 388.1 | 2.50 | 31.3 | 16.2 |
| 80.0 | 386.9 | 3.66 | 45.7 | 15.6 |
| 80.0 | 386.9 | 3.64 | 45.6 | 15.2 |
| 80.0 | 385.8 | 4.80 | 60.0 | 12.5 |
| 80.0 | 384.6 | 5.98 | 74.7 | 7.1 |
| 80.0 | 383.6 | 6.99 | 87.4 | 6.5 |
| 80.0 | 382.3 | 8.31 | 103.9 | 5.7 |

| Pluronic ® 6800 | | | | |
|---|---|---|---|---|
| Weight used | | Weight | per kg of | |
| Norit SX [g] | Water [g] | used [g] | Norit SX [g/kg] | Viscosity [mPa * s] |
| 80.0 | 390.6 | 0.00 | 0.0 | 23.0 |
| 80.0 | 390.2 | 0.39 | 4.9 | 21.5 |
| 80.0 | 389.9 | 0.67 | 8.4 | 20.2 |
| 80.0 | 389.0 | 1.59 | 19.9 | 19.0 |
| 80.0 | 387.0 | 3.56 | 44.5 | 17.0 |
| 80.0 | 383.9 | 6.64 | 83.0 | 15.2 |
| 80.0 | 378.0 | 12.54 | 156.8 | 12.0 |
| 80.0 | 367.4 | 23.24 | 290.5 | 8.1 |
| 80.0 | 356.3 | 34.31 | 428.9 | 6.0 |

| Pluronic ® 10500 | | | | |
|---|---|---|---|---|
| Weight used | | Weight | per kg of | |
| Norit SX [g] | Water [g] | used [g] | Norit SX [g/kg] | Viscosity [mPa * s] |
| 80.0 | 390.6 | 0.00 | 0.0 | 23.0 |
| 80.0 | 386.9 | 3.70 | 46.3 | 16.0 |
| 80.0 | 385.4 | 5.22 | 65.2 | 14.2 |
| 80.0 | 384.0 | 6.60 | 82.5 | 13.4 |
| 80.0 | 381.7 | 8.88 | 111.0 | 11.2 |
| 80.0 | 376.0 | 14.60 | 182.5 | 6.1 |
| 80.0 | 371.0 | 19.64 | 245.5 | 4.0 |

| Sokalan ® CP 9 | | | | |
|---|---|---|---|---|
| Weight used | | Weight | per kg of | |
| Norit SX [g] | Water [g] | used [g] | Norit SX [g/kg] | Viscosity [mPa * s] |
| 80.0 | 390.6 | 0.00 | 0.0 | 23.0 |
| 80.0 | 389.0 | 1.61 | 20.2 | 10.0 |
| 80.0 | 387.9 | 2.67 | 33.3 | 8.0 |
| 80.0 | 387.2 | 3.40 | 42.4 | 7.0 |
| 80.0 | 385.6 | 4.97 | 62.1 | 6.5 |
| 80.0 | 382.3 | 8.32 | 104.0 | 6.0 |
| 80.0 | 375.2 | 15.43 | 192.9 | 5.5 |

| Sokalan ® CP 10 | | | | |
|---|---|---|---|---|
| Weight used | | Weight | per kg of | |
| Norit SX [g] | Water [g] | used [g] | Norit SX [g/kg] | Viscosity [mPa * s] |
| 80.0 | 390.6 | 0.00 | 0.0 | 23.0 |
| 80.0 | 389.8 | 0.78 | 9.7 | 19.0 |
| 80.0 | 389.2 | 1.43 | 17.9 | 18.5 |
| 80.0 | 386.6 | 3.94 | 49.3 | 18.1 |
| 80.0 | 380.8 | 9.82 | 122.8 | 18.0 |
| 80.0 | 368.6 | 22.00 | 275.0 | 17.5 |
| 80.0 | 348.2 | 42.42 | 530.2 | 15.5 |

| Tamol ® NH 7519 | | | | |
|---|---|---|---|---|
| Weight used | | Weight | per kg of | |
| Norit SX [g] | Water [g] | used [g] | Norit SX [g/kg] | Viscosity [mPa * s] |
| 80.0 | 390.6 | 0.00 | 0.0 | 23.0 |
| 80.0 | 389.9 | 0.66 | 8.2 | 7.2 |
| 80.0 | 389.7 | 0.88 | 11.0 | 6.1 |
| 80.0 | 389.3 | 1.31 | 16.4 | 5.5 |
| 80.0 | 388.4 | 2.22 | 27.8 | 4.5 |
| 80.0 | 386.2 | 4.38 | 54.7 | 4.0 |

The second measurement shows the dependence of the viscosity of Norit SX-water suspensions, with and without addition of Tamol® NH 7519, on the Norit SX concentration. Here, the ratio of Tamol® NH 7519 to Norit SX, measured in g of Tamol® NH 7519 per kg of Norit SX, was set to 55.

The viscosity was determined using a Viscotester VT01 from Hacke.

| Weight of Norit SX used [g] | Weight of water used [g] | Concentration of Norit SX [% by weight] | Viscosity in [mPa * s] |
|---|---|---|---|
| 19.0 | 381.0 | 4.8 | 1.2 |
| 36.4 | 363.6 | 9.1 | 3.3 |
| 52.2 | 347.8 | 13.0 | 9.1 |
| 66.7 | 333.3 | 16.7 | 27.9 |
| 80.8 | 320.0 | 20.0 | 130 |

| Weight of Norit SX used [g] | Weight of water used [g] | Weight of NH 7519 used [g] | Concentration of Norit SX [% by weight] | Tamol ® NH 7519 [g/kg] | Viscosity in [mPa * s] |
|---|---|---|---|---|---|
| 19.0 | 379.9 | 1.05 | 4.8 | 55 | 1.2 |
| 68.0 | 328.3 | 3.74 | 17.0 | 55 | 4.1 |
| 80.0 | 315.6 | 4.40 | 20.0 | 55 | 13.5 |
| 88.0 | 307.2 | 4.84 | 22.0 | 55 | 24.0 |

At an amount of 20% by weight of Norit SX, based on the total weight of the suspension, the addition reduces the viscosity from 130 m Pa*s to 13.5 m Pa*s, i.e. by a factor of about 10.

Example 6

A 5% strength by weight Norit SX catalyst support suspension in water was concentrated with and without addition of surfactant. Tamol® NH 7519 (product of BASF Aktiengesellschaft) was used as surfactant. The Norit SX used initially had an average diameter of about 50 μm and was, in order to simulate attrition in an industrial reactor, comminuted to an average diameter of about 5 μm in aqueous suspension by means of a laboratory toothed ring dispersing apparatus (Ultra-Turrax). The membrane filtration was carried out at 60° C., a transmembrane pressure of 1 bar and a flow velocity of 4 m/s over a $ZrO_2$ membrane from Atech Innovations having a pore diameter of 50 nm. Without addition, a final concentration of about 20% by weight was achieved. At this concentration, it was found that the catalyst suspension could no longer be filtered in a stable fashion, i.e. the thickness of the covering layer on the membrane increased with time and ultimately led to complete blocking of the membrane. The addition of 60 or 120 g of surfactant/kg of Norit SX enabled the final catalyst concentration which could be achieved to be increased from about 20% by weight to about 32 or 37% by weight. Above a Norit SX limit concentration of about 17% by weight or about 11% by weight at an auxiliary addition of 60 or 120 g of Tamol® NH 7519/kg of Norit SX, sometimes significantly higher permeate fluxes could be achieved compared to the surfactant-free suspension. For example, in the case of a 20% strength by weight catalyst suspension, the permeate flux was increased from about 60 kg/m²/h to about 300 kg/m²/h by addition of 120 g of Tamol® NH 7519/kg of Norit SX.

0 g of Tamol® NH 7519/kg of Norit SX

| Permeate flux [kg/h * m²] | Norit SX plus (presheared) without Tamol ® NH 7519 [%] |
|---|---|
| 899 | 4.8 |
| 632 | 8.7 |
| 348 | 13.5 |
| 262 | 16.1 |
| 180 | 18.1 |
| 60 | 20.0 |

60 g of Tamol® NH 7519/kg of Norit SX

| Permeate flux [kg/h * m²] | Norit SX plus (presheared) with 6% of Tamol ® NH 7519 [%] |
|---|---|
| 314 | 5.4 |
| 278 | 10.9 |
| 252 | 13.2 |
| 142 | 23.3 |
| 43 | 30.5 |
| 12 | 31.7 |

120 g of Tamol® NH 7519/kg of Norit SX

| Permeate flux [kg/h * m²] | Norit SX plus (presheared) with 12% of Tamol ® NH 7519 [%] |
|---|---|
| 355 | 18.2 |
| 257 | 22.2 |
| 150 | 26.7 |
| 112 | 30.8 |
| 16 | 36.4 |

Example 7

In a four-stage concentration and diafiltration process, the solvent-free reaction medium from a suspension-catalyzed double bond hydrogenation (hydrogenation of pseudoionone to tetrahydrogeranylacetone) comprising 2% by weight of catalyst (Pd on a carbon support) was concentrated and conditioned. A $TiO_2$ membrane from Atech Innovations having a pore diameter of 50 nm was used as membrane. The membrane filtration was carried out at 60° C., a transmembrane pressure of 1 bar and a flow velocity of 4 m/s.

In the first step, the catalyst was concentrated from 2% by weight to 12% by weight. This resulted in a decrease in the permeate flux from an initial value of about 160 kg/m²/h to 55 kg/m²/h. In the second step, the reaction medium was replaced by isopropanol with an exchange coefficient of 3 at a constant catalyst concentration and a permeate flux at the beginning of the second step of 55 kg/m²/h and a permeate flux of 120 kg/m²/h at the end of the second step. In the third step, the isopropanol was replaced by water at a constant catalyst concentration with an exchange coefficient of 3. A permeate flux of 120 kg/m²/h was obtained at the beginning of the third step and a permeate flux of 180 kg/m²/h was obtained at the end of the third step. This gave an about 12% strength by weight catalyst suspension in water which was concentrated from about 12% by weight to 15% by weight in a fourth step with a permeate flux of 180 kg/m²/h at the beginning and a permeate flux of 55 kg/m²/h at the end of the fourth step.

|  | Step 1 Concentration | Step 2 Diafiltration (isopropanol) | Step 3 Diafiltration (water) | Step 4 Concentration |
|---|---|---|---|---|
| Permeate flux (kg/m²/h) at the beginning | 160 | 55 | 120 | 180 |
| Permeate flux (kg/m²/h) at the end | 55 | 120 | 180 | 55 |
| Catalyst concentration (% by wt.) at the beginning | 2 | 12 | 12 | 12 |
| Catalyst concentration (% by wt.) at the end | 12 | 12 | 12 | 15 |

In the fourth step, it was found that the catalyst suspension having a concentration of about 15% by weight could no longer be filtered in a stable fashion without addition of an auxiliary, i.e. the thickness of the covering layer on the membrane increased with time and ultimately led to complete blocking of the membrane.

To see the influence of the auxiliary, the retentate from the fourth step was diluted again with the permeate separated off in this step to a concentration of about 12% by weight (value before the fourth step) and the auxiliary Tamol® NH 7519 was then added stepwise up to a concentration of 48 g/kg of catalyst. The addition of the auxiliary was carried out under steady-state conditions, i.e. the permeate was fed back into the pumped circuit.

| g of auxiliary per kg of catalyst | Permeate flux [kg/m²/h] |
|---|---|
| 0.0 | 180 |
| 5 | 190 |
| 10 | 165 |
| 15 | 118 |
| 24 | 98 |
| 48 | 90 |
| Catalyst content = 11.6% | |

Here, the permeate flux did decrease up to an addition of 48 g of auxiliary/kg of catalyst but on the other hand the properties of the catalyst suspension were changed so that when concentration was carried out again the final concentration of the catalyst which could be achieved in the retentate without blocking of the membrane was increased from about 15% by weight to almost 30% by weight.

Here too, it was found that below a limit concentration (in this case about 14% by weight) the addition of auxiliary (Tamol® NH 7519) leads to a decrease in the permeate flux, but above this limit concentration it leads to significantly higher permeate fluxes and also to more problem-free operation of the membrane filtration unit, as a result of which significantly higher final catalyst concentrations are achieved.

| Concentration in H₂O (without auxiliary) | | Concentration in H₂O (4.8 g of auxiliary/ 100 g of catalyst) | |
|---|---|---|---|
| Cat. content [%] | Flux [kg/m²/h] | Cat. content [%] | Flux [kg/m²/h] |
| 11.6 | 178 | 11.6 | 71 |
| 12.7 | 120 | 19 | 55 |
| 13.5 | 90 | 24 | 40 |
| 14.9 | 55 | 28.9 | 35 |

The invention claimed is:

1. A method, comprising:
removing at least part of a reaction medium from one or more reactors to obtain a removed reaction medium in a circulation vessel, said reaction medium comprising a suspension of completely or partially inactivated catalyst and at least one of a reaction product and a reaction starting material; and
subjecting the removed reaction medium to at least one membrane filtration in a membrane filter, thereby separating and purifying the completely or partially inactivated catalyst, to obtain an aqueous catalyst suspension comprising the completely or partially inactivated catalyst,
wherein:
the at least one membrane filtration includes at least one diafiltration in which a diafiltration medium is added to a retentate side of the membrane filter during membrane filtration, such that the addition of the diafiltration medium does not alter a concentration of the completely or partially inactivated catalyst in the circulation vessel; and
a composition of the diafiltration medium is different from a composition of the reaction medium,
the diafiltration occurs in the presence of at least one auxiliary added to the suspension; and
the suspension prior to the at least one membrane filtration has a catalyst concentration above a limit concentration, such that the presence of the at least one auxiliary is effective to increase permeate flux while increasing catalyst concentration in the retentate beyond amounts achieved in the absence of the at least one auxiliary.

2. The method according to claim 1, further comprising:
subjecting the removed reaction medium to at least one concentration filtration to obtain a concentrated medium containing the completely or partially inactivated catalyst, wherein a volume of the concentrated medium in the circulation vessel after the at least one concentration filtration is smaller than a volume of the removed reaction medium in the circulation vessel before the at least one concentration filtration.

3. The method according to claim 2, wherein a first of the at least one concentration filtration is carried out before a first diafiltration, and a second of the at least one concentration filtration is carried out after a last diafiltration.

4. The method according to claim 2, comprising adding the diafiltration medium to the concentrated medium, such that the addition of the diafiltration medium does not alter the concentration of the completely or partially inactivated catalyst in the circulation vessel.

5. The method according to claim 1, wherein the diafiltration medium is miscible without a phase boundary with the reaction medium.

6. The method according to claim 1, wherein:
the aqueous catalyst suspension, as a retentate after the method, has a concentration of impurities of less than 1% by weight, based on a total weight of the aqueous catalyst suspension; and
the impurities are products, starting materials, organic solvents, or mixtures thereof.

7. The method according to claim 1, wherein the at least one auxiliary is selected from the group consisting of a surfactant, a wetting agent, and a dispersant.

8. The method according to claim 7, wherein the at least one membrane filtration occurs in the presence of from 0.1 to 50% by weight of the at least one auxiliary, based on a total weight of the completely or partially inactivated catalyst in the removed reaction medium.

9. The method according to claim 7, wherein the at least one auxiliary is selected from the group consisting of an ethoxylated fatty alcohol, a polyethylene glycol-polypropylene glycol block polymer, a compound bearing a carboxyl group, a compound bearing a sulfonic acid group, a compound bearing a phosphonic acid group, a compound bearing a quaternary ammonium group, a polycarboxylic acid, a polyvinylphosphonic acid, a polymeric amine based on a hydrolyzed polyvinylformamide, and a polymeric amine based on a hydrolyzed ethylenimine.

10. The method according to claim 1, wherein the completely or partially inactivated catalyst has been used for hydrogenations, oxidations, isomerizations and/or hydroisomerizations.

11. The method according to claim 1, wherein the reaction medium is removed from one or more continuously operated reactors.

12. The method according to claim 1, wherein the inactivated catalyst in the reaction medium has lost at least 10% of its catalytic properties.

13. The method according to claim 1, comprising:
subjecting the removed reaction medium to at least one diafiltration to obtain a suspension medium containing the completely or partially inactivated catalyst, without altering the concentration of the completely or partially inactivated catalyst in the circulation vessel; and
subjecting the suspension medium to at least one concentration filtration to obtain a concentrated medium containing the completely or partially inactivated catalyst, wherein a volume of the concentrated medium in the circulation vessel after the at least one concentration filtration is smaller than a volume of the suspension medium in the circulation vessel before the at least one concentration filtration.

14. The method according to claim 1, comprising:
subjecting the removed reaction medium to at least one diafiltration to obtain a suspension medium containing the completely or partially inactivated catalyst, without altering the concentration of the completely or partially inactivated catalyst in the circulation vessel; and
subjecting the suspension medium to at least one concentration filtration to obtain the aqueous catalyst suspension comprising the completely or partially inactivated catalyst, wherein a volume of the aqueous catalyst suspension in the circulation vessel after the at least one concentration filtration is smaller than a volume of the suspension medium in the circulation vessel before the at least one concentration filtration.

* * * * *